United States Patent [19]

Lloyd

[11] 4,018,191
[45] Apr. 19, 1977

[54] ROTARY INTERNAL COMBUSTION ENGINE

[76] Inventor: L. Babcock Lloyd, 508 South Bradfield, Compton, Calif. 90221

[22] Filed: Oct. 14, 1975

[21] Appl. No.: 621,866

[52] U.S. Cl. .............................. 123/8.45; 123/8.05; 418/31; 418/108; 415/159; 123/8.13
[51] Int. Cl.² .................................. F02B 55/14
[58] Field of Search .............. 123/8.45, 8.05, 8.07, 123/8.09, 8.11, 8.13; 418/29, 31, 108, 109, 159, 182

[56] References Cited

UNITED STATES PATENTS

| 834,737 | 10/1906 | Kaiser | 418/109 |
|---|---|---|---|
| 1,758,320 | 5/1930 | Hoss | 123/8.45 |
| 2,016,315 | 10/1935 | Calzonl | 418/31 |
| 2,298,525 | 10/1942 | Briggs | 123/8.13 |
| 2,345,561 | 4/1944 | Allen | 123/8.45 |
| 2,651,453 | 9/1953 | Le Febvre | 418/109 |
| 3,204,563 | 9/1965 | Eickemeyer | 418/31 |
| 3,637,332 | 1/1972 | McAnally | 123/8.05 |
| 3,791,779 | 2/1974 | Nelson | 418/30 |

FOREIGN PATENTS OR APPLICATIONS

| 420,975 | 3/1925 | Germany | 418/31 |
|---|---|---|---|
| 435,383 | 10/1947 | Italy | 418/29 |

Primary Examiner—Clarence R. Gordon
Attorney, Agent, or Firm—William C. Babcock

[57] ABSTRACT

A rotary internal combustion engine that includes a housing that defines an elliptical cavity in which a rotor is disposed. The rotor slidably supports a number of circumferentially spaced, radially disposed blades, with each pair of blades defining a chamber therebetween. The rotor is so rotatably supported in the cavity that the ratio of the intake chamber volume may be adjusted so that there is a minimum residual pressure on exhaust gases and the efficiency of the engine is increased as a result thereof.

1 Claim, 4 Drawing Figures

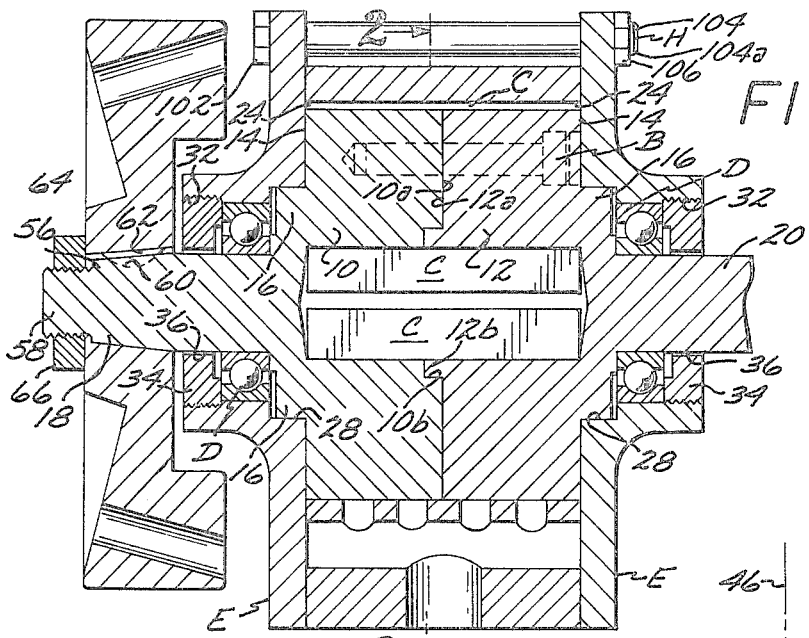
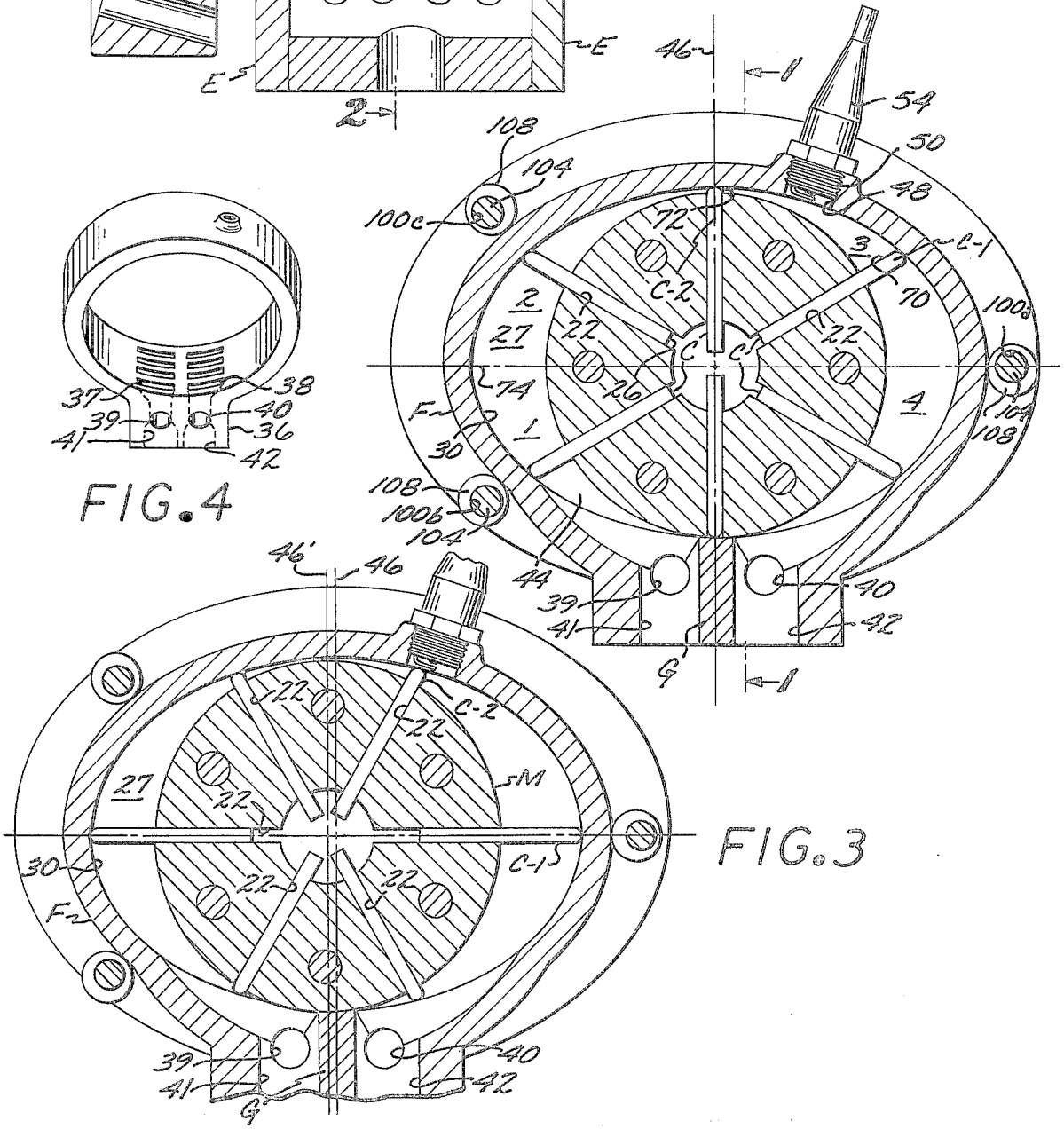

ROTARY INTERNAL COMBUSTION ENGINE

BACKGROUND OF THE INVENTION

1. Field of the Invention

A rotary internal combustion engine.

2. Description of the Prior Art

In the past, various types of rotary internal combustion engines have been devised, and used to a limited degree. This limited use has at least to a degree arisen by the fact that such prior art engines are unduly complicated, difficult to dismantle and repair, expensive to manufacture and have undesirable operating characteristics.

The primary object is devising the present invention is to supply a rotary internal combustion engine that has an extremely simple mechanical structure, is easy to manufacture and maintain, has desirable operating characteristics, is self-firing after it has been placed in operation, and thus the necessity for expensive ignition timing devices is eliminated.

Another object of the invention is to provide a rotary internal combustion engine in which the ratio of the intake chamber volume to the exhaust chamber volume is manually adjustable to the extent that there is a minimum of residual pressure in the exhaust gases.

SUMMARY OF THE INVENTION

A rotary internal combustion engine that includes a stator housing that has an elliptical working cavity defined therein in which a rotar is rotatably supported, and longitudinally adjustable on the major axis of the housing. The rotor is formed with a plurality of circumferentially spaced, radially positioned slots in which free floating vanes are slidably mounted. The vanes are in slidable sealing contact with the interior side surfaces of the housing, and are held in slidable sealing contact with the exterior outer surface of the cavity by centrifugal force as the engine operates.

The housing is provided with an air-fuel intake passage and a gaseous products of combustion discharge passage that are separated from one another, and preferably located on opposite sides of the minor axis of the cavity defined in the housing. Guide means are provided to prevent the vanes from moving downwardly into said passage as the vanes rotate thereby. As the vanes rotate they define chambers therebetween that vary in volume, with the air-fuel mixture after initially being admitted into one of the chambers being compressed. As the compressed air-fuel mixture is fired at a desired compression ratio after the leading vane defining a chamber has passed the minor axis of the working cavity, and is so disposed that it has a greater surface area exposed to the exploding charge in the chamber that it partially defines then the surface area of the trailing vane. As the charge is exploded between the leading and trailing vanes that define a chamber, the exploding gas drives the rotor in a direction in which the leading vane moves toward the products-of-combustion discharge passage.

Currently, as this operation takes place, the air-fuel mixture in the compartment immediately following the compartment in which the explosion took place is compressed to the adjusted compression ratio, and is subsequently exploded by ignition means forming a part of the engine. As the vanes defining a chamber that is filled with gaseous products-of-combustion sweep past the discharge passage such products-of-combustion are completely discharged therefrom due to the rotor, housing, and vanes cooperating to reduce the volume of the chamber to substantially zero. Immediately after this chamber that was previously filled with gaseous products-of-combustion has been purged of the latter, it is exposed to the passage through which an air-fuel mixture may flow therein.

When the air-fuel mixture flows into a chamber it flows into one free of products-of-combustion. Accordingly, maximum utilization of the air-fuel mixture is attained, for if the ratio of air to fuel is correct, the explosion resulting when the fuel is ignited results in substantially the complete burning thereof, and no unburned fuel or partially oxidized products-of-combustion are discharged from the engine to contaminate the atmosphere. When the engine is operating, each chamber is expanding in volume as it passes the air-fuel intake passage. As a result, each compartment is at a negative pressure when exposed to the air-fuel intake passage which facilitates the rapid flow of the air-fuel mixture into the compartment.

A major object of the present invention is to provide a rotary internal combustion engine which includes a housing assembly that defines an elliptical cavity in which a vane-supporting rotor rotates, with the diameter of the rotor and the shape of the cavity used controlling the degree of compression of the air-fuel mixture prior to firing of the latter, with the longitudinal position of the axis of rotation of the rotor on the major axis of the elliptical cavity permitting the ratio of the intake chamber volume to the exhaust chamber volume to the so regulated that there is a minimum residual pressure in the exhaust gases.

In any internal combustion engine, the heat due to fuel combustion, results in a volume of products-of-combustion gases considerably in excess of the volume of the intake gases before combustion. Thus, in the standard reciprocating engine, which inherently has the same volume of intake and combustion chambers, the excess volume of combustion gases is not utilized through the entire expansion, but arbitrarily exhausted, resulting in loss of the power potential of all the remaining pressure in the combustion chamber.

Another object of the invention is to furnish a rotary engine utilizing a multiple-vane rotor that makes it practical to locate the rotor, not necessarily on the minor axis of the elliptical cavity, but a calculated position in the cavity to decrease the volume of each intake chamber in relation to the volume of each combustion chamber to allow for optimum expansion of gases before exhausting.

A further object of the present invention is to supply a compact rotary internal combustion engine capable of operating with a high degree of efficiency, one that has a simple mechanical structure, requires a minimum of maintenance attention, may be operated to be self-firing, and one that discharges a minimum of quantity of unburned fuel and partially oxidised products-of-combustion into the ambient atmosphere, and one in which the compression ratio of the air-fuel mixture may be manually adjusted at the firing position.

Still another object of the invention is to supply a rotary engine in which a housing, rotor and plurality of circumferentially spaced, radially movable vanes cooperatively provide a plurality of chambers that vary in volume as the rotor rotates, with each chamber being completely purged of products-of-combustion prior to receiving a charge of an air-fuel mixture due to the volume of each chamber being reduced to substantially zero as it sweeps past the products-of-combustion discharge opening.

Yet another object of the invention is to furnish a rotary engine in which each charge of air-fuel mixture is effected without the charge being contaminated by products-of-combustion from a previous firing.

BRIEF DESCRIPTION OF THE DRAWING

FIG. 1 is a transverse cross-sectional view of the rotary internal combustion engine, taken on the line 1—1 of FIG. 2;

FIG. 2 is a second cross-sectional view of the engine, taken on line 2—2 of FIG. 1, and with two of the vanes being positioned on opposite sides of a spark plug to impart torque to the rotor and shafts due to the differential in areas of the vanes exposed to the exploded charge of an air-fuel mixture;

FIG. 3 is the same view as shown in FIG. 2, but with two of the vanes cooperating with the housing assembly to define a chamber of a compressed air-fuel mixture at a desired compression ratio that will be ignited when the leading vane defining the chamber has rotated to the extent that the area exposed to the exploding charge of air-fuel mixture is greater than that of the area exposed on the trailing vane, with the phantom lines illustrating how the axis of rotation of the rotor may be adjusted on the major axis of the elliptical chamber in the housing; and FIG. 4 is a perspective view of a lower portion of the stator housing.

DESCRIPTION OF THE PREFERRED EMBODIMENT

The rotary internal combustion engine A, as can best be seen in FIG. 1, includes first and second multiple slotted, heavy-walled cylindrical rotor bodies 10 and 12, with said bodies having first end surfaces 10a and 12a thereof in abutting contact. The first and second bodies 10 and 12 have first end surfaces 14 that develop into outwardly and oppositely projecting third cylindrical bodies 16. The third bodies 16 associated with the first and second rotor bodies 10 and 12 respectively, have first and second shafts 18 and 20, respectively, extending outwardly therefrom in opposite directions.

The first and second cylindrical bodies 10 and 12 have radially extending slots 22 therein, as may best be seen in FIGS. 2 and 3, with these slots being axially aligned, and the slots slidably and sealingly supporting free floating rectangular vanes C.

Bolts B, or other suitable fastening means are employed to hold the first and second cylindrical rotor bodies 10 and 12 together, as shown in FIG. 1. To obtain true axial alignment of the first and second shafts 18 and 20, it is desirable to form the first body 10 with a cylindrical recess 10b that is snugly engaged by a cylindrical boss 12b formed on the second body 12. The vanes C, as can best be seen in FIG. 1, are rectangular in shape, and have parallel side edges 24 and end edges 26. The first and second shafts 18 and 20, as can best be seen in FIG. 1, are rotatably supported by conventional ball bearing or roller bearing anti-friction bearings D of a conventional design.

Two laterally spaced stator side plates E are provided that are illustrated as being of generally elliptical shape, and the side plates having axially aligned transverse openings 28 therein that extend through center, heavy-walled portions 30 thereof. The openings 28 have sections of various diameters formed therein, and such that the third cylindrical bodies 16 are snugly and rotatably supported in the openings 28, as well as the openings 28 serving to support the antifriction bearings D at fixed positions therein. The outer portions of the openings 28 have threads 32 formed therein, which threads are engaged by externally threaded portions of two plates 34 that have openings 36 extending transversely therethrough. The shafts 18 and 20 project outwardly through the openings 36 in plates 34 as illustrated in FIG. 1.

A stator shell F is provided that has an elliptical chamber 27 defined therein by an elliptical interior surface 30, as shown in FIG. 2. The shell H has a heavy walled lower portion 36, as best seen in FIG. 4, in which first and second sets of transversely and circumferentially spaced slots 37 taper downwardly to communicate with first and second transverse recesses 39 and 40. The recesses 39 and 40 are shown in FIG. 4 as being of circular cross section. A first passage 41 extends upwardly in shell portion 36 to communicate with recess 39 and slots 37. First passage 41 serves as an inlet for an air-fuel mixture into chambers 44 as the first and second bodies 10 and 12, and vanes C rotate in a clockwise direction, as viewed in FIG. 2. Each chamber 44 is defined by a pair of vanes C, and sections of rotor 10 and 12, surface 30, and side plates E. A second passage 42 is also formed in shell portion 36 and extends upwardly therein to communicate with second recess 40 and second slots 38. The second passage 42 serves as a discharge for gaseous products-of-combustion that result when the air-fuel mixture is exploded within the confines of the rotary engine A. The first and second passages 41 and 42, first and second sets of slots 37 and 38, and first and second recesses 39 and 40 are separated by a transverse partition G forming a part of shell portion 41. The partition G is of substantial width and is preferably centered on a line 46 that is the minor axis of the elliptical cavity 27.

In FIG. 2 it will be seen that the shell F to the right of the line 46 has a recess 48 formed therein that is of somewhat greater length than the thickness of one of the vanes C. The recess 48 is in communication with a tapped bore 50 formed in an outwardly projecting portion 52 of the shell, and this threaded portion is engaged by a conventional spark or glow plug 54.

The first shaft 18, as can best be seen in FIG. 1, has a tapered portion 56 that develops on its outer extremity into an externally threaded stud 58. The tapered portion 56 has a longitudinal slot 60 therein that is removably engaged by a key 62 which also engages a longitudinal slot (not shown) formed on the interior surface of a flywheel 64. A nut 66 engages stud 58, and when tightened serves to hold the flywheel 64 on the first shaft 18, and the key 62 prevents rotation of the flywheel relative to the shaft. The second shaft 20 provides the power take-off when the engine A is operated.

In the starting of the engine A, the spark or glow plug 54 is energized to cause combustion of the air-fuel mixture in one of the compartments 44. After the leading vane C-1 has rotated beyond the minor axis 46, as shown in FIG. 2, the vane has an area 70 exposed to explosion of the air-fuel mixture in the chamber 44 that is greater than the exposed area 72 of the trailing vane C-2. When the air-fuel mixtures between areas 70 and 72 is exploded, the first and second rotor bodies 10 and 12, together with the first and second shafts 18 and 20 are driven in a clockwise direction as viewed in FIG. 2 due to the differential between areas 70 and 72. After this explosion, the air-fuel mixture will continue to expand in the chamber 44 between the vanes C-1 and C-2 until the vane C-1 passes through the major axis 74 of elliptical cavity 27.

During the time that this driving of the vane C-1 in a clockwise direction is taking place, the air-fuel mixture in the chamber 44 to the left of the vane C-2, as shown in FIG. 2, is being compressed, with the vane C-2 as motion in a clockwise direction occurs, as viewed in FIG. 2, becoming the leading vane for the next compartment 44.

When the vane C-2 sweeps by the recess 48, a small volume of the hot gaseous products-of-combustion flow to the left through the recess 48, as viewed in FIG. 3, and ignites the charge of air-fuel mixture in the next following chamber 44. Such ignition of one charge in a chamber 44 by another as the chambers sweep by the recess 48 occur sequentially and continuously, and as a result, the spark or glow plug 54 need only be used in the initial starting of the engine.

The minor axis 46 and major axis 74 subdivide the interior of the stator shell H into four quadrants which are identified in FIG. 2 by the numerals 1, 2, 3 and 4, respectively. During the time that two of the adjacently disposed vanes C are moving through quadrants 1 and 2, the air-fuel mixture in the compartment defined thereby is compressed, and as the same pairs of vanes move through the quadrants 3 and 4, the compressed air-fuel mixture is exploded with the result that the rotor bodies 10 and 12 are driven in a clockwise direction as viewed in FIG. 1.

It will be particularly noted that as a pair of vanes C having products-of-combustion situated therebetween moves through the fourth quadrant 4, the volume of space between the pair of vanes is reduced to substantially zero, with the products-of-combustion being discharged through second slots 38, second recess 40 and second passage 42. The pair of vanes C then moves into first quadrant 1, with the volume between the vanes C increasing to draw a charge of the air-fuel mixture thereinto through the first slots 37, first recess 39 and first passage 41. The open ends of the first and second recesses 39 and 40 are closed by plugs (not shown). Side plates E and stator shell F are illustrated in the drawing as being held together as an integral unit by bolts H, as shown in FIG. 1.

The bolts H extend through first, second and third pairs of transversely aligned openings 100a, 100b and 100c formed in the marginal portions of the side plates E. The first pair of openings 100a is located on the major axis 74, and the second and third pair of openings 100b and 100c are intermediately located between the major axis 74 and minor axis 46. Each bolt H includes a head 102, shank 104 and a lock nut means 106 that engage threaded portions 104a of the shank. Each shank 104 supports a cam 108 that is in abutting contact with the exterior surface of stator shell F. By manually rotating bolts H when lock nut means 106 are loosened, the cams 108 may be rotated to concurrently shift the side plates E and rotor vane assembly M to the left as shown in FIG. 3 on major axis 74 relative to stator shell F. When rotor vane assembly M has been moved from being centered on minor axis 46 to a centered position on minor axis 46', the lock nut means 106 are tightened to hold side plates E at fixed adjusted positions relative to stator shell F.

It will be seen that when the rotor assembly M is moved to the left to be centered on minor axis 46', the volume of space between rotor assembly M and stator shell F to the left of minor axis 46' is less than the volume of space to the right thereof. Thus, optimum expansion of each charge of air-fuel mixture may take place after firing and the pressure thereof reduced to a minimum prior to discharge thereof through passage 42. By varying the diameter of the rotor bodies 10 and 12 relative to the interior of stator shell F, the compression ratio of an air-fuel charge may be varied at the time of firing.

The engine A may be started by providing teeth (not shown) on the flywheel 64 that are removably engaged by a Bendix-type electrically operated starter (not shown). Should it be desired to maintain the vanes C in contact with surface 30 even when the engine is not operating, passage means (not shown) of conventional design may be provided to bleed off compressed air-fuel mixture or pressurized products-of-combustion from between the vanes C into the confined space 84 within the rotor bodies 10 and 12. The cooling and lubrication systems for engine A are not shown, as conventional systems may be used for this purpose. The upper end of the partition G is slightly curved in a transverse direction, to offer a minimum of resistance when sequentially contacted by the outer ends of the vanes C.

The use and operation of the invention has been described previously in detail and need not be repeated.

I claim:

1. An internal combustion rotary engine of the type that includes a housing having an interior open end cavity in the shape of an ellipse that has a continuous surface and a major and a minor axis, and major and minor axis dividing said ellipse to first, second, third and fourth quadrants, said housing having an air-fuel inlet and a products of combustion discharge outlet formed therein that are separated by a transverse partition and are in communication with said first and fourth quadrants of said cavity; an assembly that includes a rotor having circumferentially spaced, radially extending slots formed therein, first and second axially aligned shafts projecting outwardly from opposite ends of said rotor, and a plurality of blades slidably supported in said slots, said blades having outer ends that slidably and sealingly engage the surface of said housing that define said cavity when said blades are moved outwardly by centrifugal force as said rotor rotates, with each of said pair of blades in combination with said rotor and housing cooperatively defining a chamber that varies in volume as said rotor rotates towards said fourth quadrant, and each of said chambers being reduced to substantially zero volume to discharge said products of combustion through said discharge outlet as said chamber moves from said fourth quadrant to said first quadrant; means for firing said air-fuel mixture in each of said chambers as the latter enter said third quadrant and have the exposed surface area of the leading blade defining said chamber greater than the exposed surface area of the trailing blade defining said chamber; wherein the improvement comprises:

a. first and second side plates that sealingly engage opposite sides of said housing to close said cavity thereon, and rotatably support said first and second shafts, with said rotor and blades disposed in said cavity;

b. first means for holding said side plates in sealing engagement with said housing and said first means including:
   1. a plurality of bolts, with each bolt including a head and at least a partially threaded shank, with each shank extending through one of said pair of openings; and
   2. a plurality of nuts that engage said threaded shanks, with said nuts when tightened cooperating with said heads of said bolts to hold said first and second side plates in sealing engagement with said housing; and
c. second means for sliding said first and second side plates and assembly relative to said housing while maintaining said sealing engagement to increase the volume of each of said chambers as it moves through said third and fourth quadrants relative to the volume thereof when moving through said first and second quadrants, and by so doing discharging said products of combustion at a residual pressure less than that which occurs when said rotor is centered for rotation on said minor axis, said second means including a plurality of cams that extend from said shanks and engage the exterior surface of said housing, with said bolt and cams when rotated shifting said side plates and assembly as a unit relative to said housing.

* * * * *

UNITED STATES PATENT OFFICE
CERTIFICATE OF CORRECTION

Patent No. 4,018,191    Dated April 19, 1977

Inventor(s) Lloyd L. Babcock

It is certified that error appears in the above-identified patent and that said Letters Patent are hereby corrected as shown below:

In item [76] "L.Babcock Lloyd" should read -- Lloyd L. Babcock --.

Signed and Sealed this

Twenty-second Day of November 1977

[SEAL]

Attest:

RUTH C. MASON
Attesting Officer

LUTRELLE F. PARKER
Acting Commissioner of Patents and Trademarks